United States Patent [19]
Uehara

[11] Patent Number: 6,046,974
[45] Date of Patent: Apr. 4, 2000

[54] OPTICAL PICKUP TRANSPORT MECHANISM

[75] Inventor: Kenji Uehara, Fukushima-ken, Japan

[73] Assignee: Alps Electric Co., Ltd., Japan

[21] Appl. No.: 08/797,363

[22] Filed: Feb. 7, 1997

[30] Foreign Application Priority Data

Aug. 2, 1996 [JP] Japan ..................... 8-022698

[51] Int. Cl.⁷ .................................. G11B 17/30
[52] U.S. Cl. .......................................... 369/219
[58] Field of Search .................... 369/219, 215, 369/220, 226; 360/105–107

[56] References Cited

U.S. PATENT DOCUMENTS 4,005,493  1/1977  Morgan .................... 360/106
5,119,362  6/1992  Yanagisawa .............. 369/219
5,189,570  2/1993  Maeda et al. .............. 360/75
5,198,946  3/1993  Kurosawa ................. 360/105
5,384,761  1/1995  Hashimoto ............. 369/44.26

FOREIGN PATENT DOCUMENTS 58-115659  7/1983  Japan ..................... 369/219
2217094   10/1989  United Kingdom ...... 369/219

Primary Examiner—Allen T. Cao
Attorney, Agent, or Firm—Brinks Hofer Gilson & Lione

[57] ABSTRACT

An optical pickup transport mechanism in which a part of a plate spring member fixed to a mount for an optical pickup is pressed into a helical slot in a screw shaft to form an engaging projection, and the optical pickup is provided with loose insertion sections (a first regulation section) for prohibiting disengagement of the engaging projection from the helical slot, and a regulation wall (a second regulation section).

2 Claims, 4 Drawing Sheets

OPTICAL PICKUP TRANSPORT MECHANISM

BACKGROUND OF THE INVENTION

1. Field of the Invention

The present invention relates to an optical pickup transport mechanism suitably for use in CD-ROM drives and the like.

2. Description of the Related Art

A transport mechanism in which a screw shaft is rotated by a stepping motor to linearly reciprocate a head member has been adopted in magnetic disc drives and the like. In recent years, such a transport mechanism has also been adopted in apparatuses for driving optical discs, such as CD-ROM drives and the like. That is, in such an optical disc drive, in order to linearly reciprocate an optical pickup which performs reading and writing with respect to the optical disc, an engaging projection provided on the optical pickup is slidably engaged with a helical slot in a screw shaft, and the screw shaft is rotated in normal and reverse directions by a stepping motor, whereby the optical pickup can be transported along the axial direction of the screw shaft through the engaging projection.

FIG. 10 schematically illustrates a conventional optical pickup transport mechanism of this type. Referring to FIG. 10, one side of the optical pickup 1 is slidably supported by a guide shaft 2, and on the other side of the optical pickup 1, there are provided an engaging projection 4 for slidably engaging the optical pickup 1 with a helical slot 3a in a screw shaft 3, and a follower spring 5 for elastically bringing the optical pickup 1 into contact with the screw shaft 3 from the opposite side of the engaging projection 4. Since the engaging projection 4 is pressed into the helical slot 3a using a reaction force of the screw shaft 3 received from the follower spring 5, when the screw shaft is rotated in the normal and reverse directions by a stepping motor (not shown), the engaging projection 4 reciprocates in directions perpendicular to the surface of FIG. 10 while being guided by the helical slot 3a. Therefore, the optical pickup 1 can be transported in consistent directions through the engaging projection 4.

According to the above conventional optical pickup transport mechanism, the optical pickup 1 jumps up counterclockwise, as shown in FIG. 10 against a resilient force of the follower spring 5 when an external shock is applied thereto, so that the engaging projection 4 tends to disengage from the helical slot 3a in the screw shaft 3. Therefore, when impact force is applied to the optical pickup 1 in the direction perpendicular to the surface of FIG. 10, the optical pickup 1 supported by the guide shaft 2 alone may slide to a limit point in the transport range to collide with other members. When the optical pickup 1, which is a precision device including lenses, etc., collides with other members, trouble such as deviation of optical axis or damage to the optical pickup 1 tends to occur, so that product reliability may decrease.

SUMMARY OF THE INVENTION

It is an object of the present invention to provide an optical pickup transport mechanism which prevents disengagement of an engaging projection from a helical slot in a screw shaft when an external shock is applied to the optical pickup, and avoids collision of the optical pickup with other members.

According to an aspect of the present invention, there is provided an optical pickup transport mechanism in which one side of an optical pickup performing reading and writing of information with respect to an optical disc is slidably supported by a guide shaft, an engaging projection provided on the other side of the optical pickup is slidably engaged with a helical slot in a screw shaft, and the screw shaft is rotated by a stepping motor thereby reciprocating the optical pickup through the engaging projection, wherein the optical pickup is provided with a regulation section for prohibiting disengagement of the engaging projection from the helical slot.

In the optical pickup transport mechanism constructed as described above, when an external shock is applied to the optical pickup to allow and the engaging projection to jump up within the helical slot in the screw shaft by a predetermined amount, a further jumping action is regulated by the regulation section so that the engaging projection does not disengage from the helical slot. Therefore, an unexpected accident such as the optical pickup sliding by impact force to collide with other members can be avoided.

In the construction as described above, if a portion of a spring plate member fixed to a predetermined section of the optical pickup is pressed into the helical slot to form the engaging projection, and a first regulation section for loosely inserting the screw shaft thereinto and a second regulation section formed by extending the predetermined section to a position where it closely faces the back face of the engaging projection are provided, the first regulation section abuts against the screw shaft to restrict separation of the second regulation section from the screw shaft, and the second regulation section regulates the engaging projection from the back face side when a shock is applied to the optical pickup. Therefore, jumping of the engaging projection can be regulated to such a degree that the projection does not disengage from the helical slot.

Further, if a section located on the opposite side of the engaging projection with the screw shaft therebetween and closely facing the screw shaft is projected onto a synthetic resin member, which is integral with the engaging section, and the projected section is allowed to serve as the regulation section, a further jumping of the engaging projection can be prevented by bringing the regulation section into abutment with the screw shaft when the engaging projection jumps up within the helical slot by a predetermined amount.

DESCRIPTION OF THE PREFERRED EMBODIMENTS

The preferred embodiments of the present invention will be described with reference to the accompanying drawings.

Figure 1:
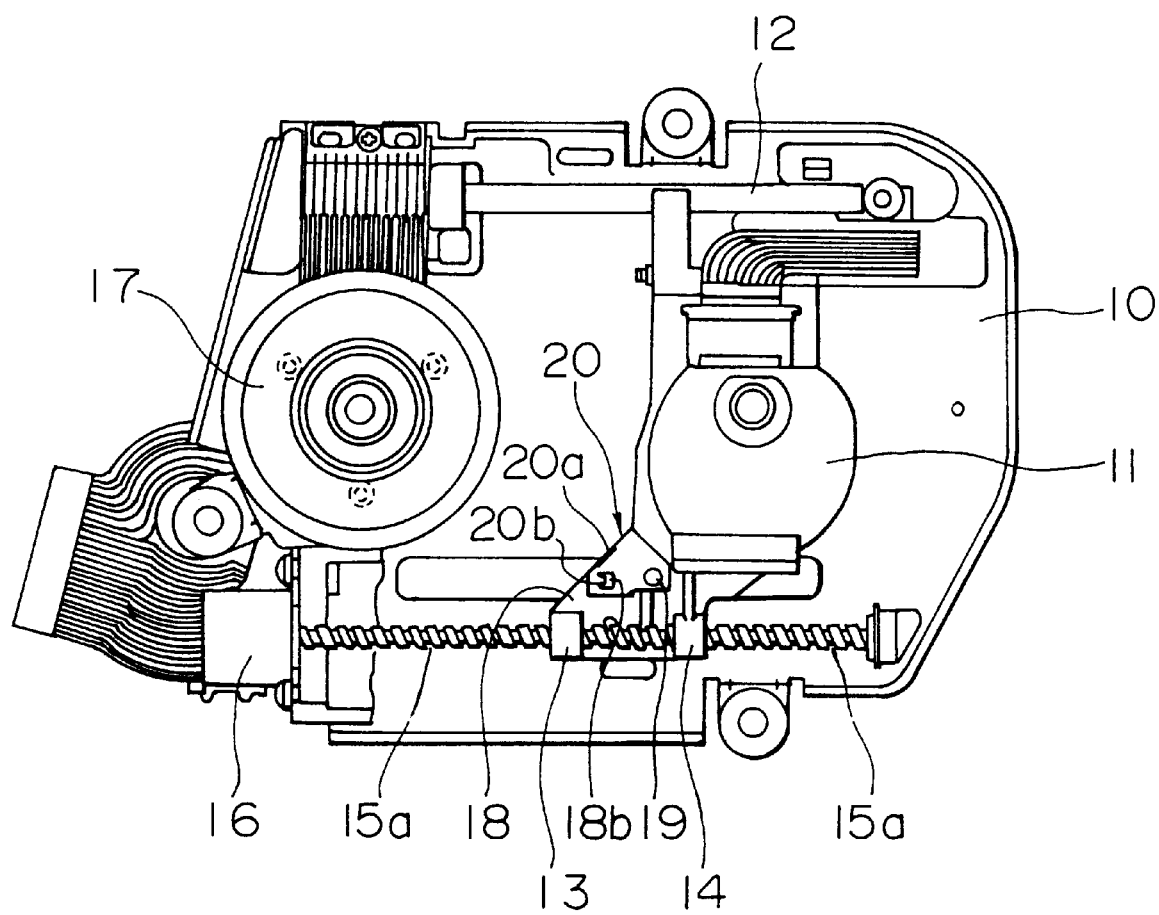
FIG. 1 is a plan view showing an inner construction of an optical disc drive in which an optical pickup transport mechanism according to the present invention is adopted.
Figure 4:
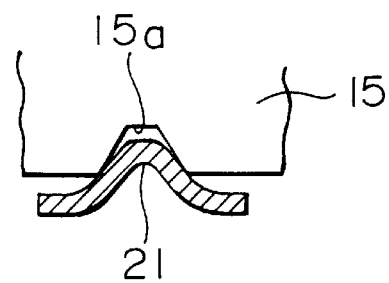
FIG. 4 is a main part sectional view for explaining an engagement condition of the engaging projection shown in FIG. 3 with a screw shaft.

On a chassis 10 of an optical disc drive shown in FIG. 1, there are disposed an optical pickup 11 which is a carriage having a head member for performing reading of information with respect to an optical disc, a guide shaft 12 for slidably supporting one side of the optical pickup 11, a screw shaft 15 loosely inserted into a pair of cylindrical loose insertion sections 13 and 14, which are molded articles projected onto the other side of the optical pickup 11, a stepping motor 16 for intermittently rotating the screw shaft 15, and a spindle motor 17 for rotating the optical disc upon loading. In addition, a mount 18, which is a molded article extending like a flat plate toward a gap between the chassis 10 and the screw shaft 15 and integrated with the loose insertion sections 13 and 14, is projected onto the optical pickup 11. An engaging projection 21 located between the pair of loose insertion sections 13 and 14 to be pressed into a helical slot 15a in the screw shaft 15 is formed at the distal end of a plate spring member 20 made of a thin metal plate which is fixed on the mount 18 with a screw 19. The engaging projection 21 is pressed into the helical slot 15a so that it comes into linear-contact with the inner wall surface of the helical slot 15a to be slidably engaged with the helical slot 15a (see FIG. 4). Therefore, by rotating the screw shaft 15 with the stepping motor 16, the optical pickup 11 can be transported through the engaging projection 21 along the axial direction of the guide shaft 12 and the screw shaft 15.

Figure 2:
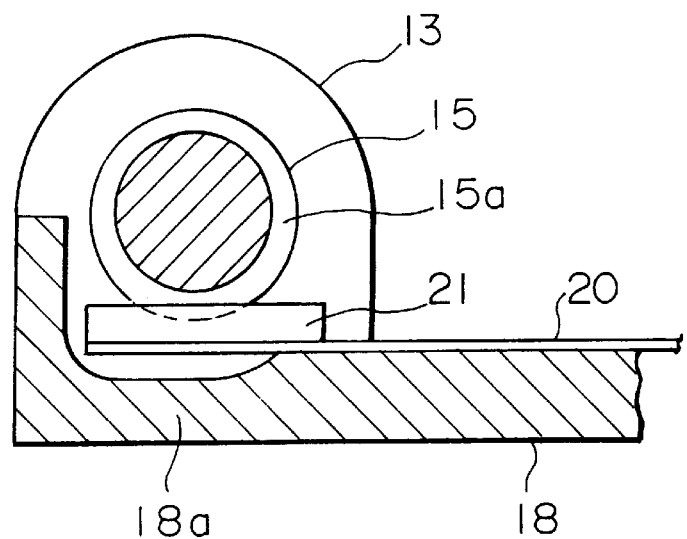
FIG. 2 is a main part sectional view of the optical pickup transport mechanism shown in FIG. 1.
Figure 3:
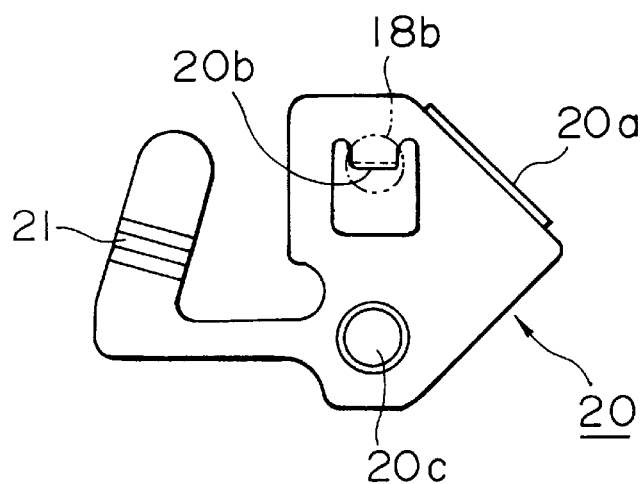
FIG. 3 is a plan view of a plate spring member with an engaging projection shown in FIGS. 1 and 2.

A base end portion of the plate spring member 20 includes a rising piece 20a which is a pick-up piece for picking up the plate spring member 20 so as to be easily assembled on the mount 18, a locking piece 20b fitted to a recessed section 18b of the mount 18 to serve as a detent, and a screw hole 20c (see FIG. 3) for piercing the screw 19 therethrough. In addition, a section of the mount 18 located between the chassis 10 and the screw shaft 15 has a recessed relief groove formed in the upper portion thereof to serve as a regulation wall 18a closely facing the back face of the engaging projection 21, as shown in FIG. 2.

In the above optical pickup transport mechanism, when an external shock is applied on the optical pickup 11 to allow the engaging projection 21 to jump up within the helical slot 15a in the screw shaft 15 by a predetermined amount, the regulation wall 18a, for which separation from the screw shaft 15 is regulated by the loose insertion sections 13 and 14, regulates the position of the engaging projection 21 from the back face side. Therefore, the engaging projection 21 cannot jump up to such an extent as to disengage from the helical slot 15a. When the engaging projection 21 is designed not to disengage from the helical slot 15a, an unexpected accident such as the optical pickup 11 sliding by impact force to collide with other members can be avoided. Thus, the risk of trouble or damage to the optical pickup 11, which is a precision device including lenses, etc., caused by shock decreases remarkably, whereby product reliability is substantially enhanced.

Figure 5:
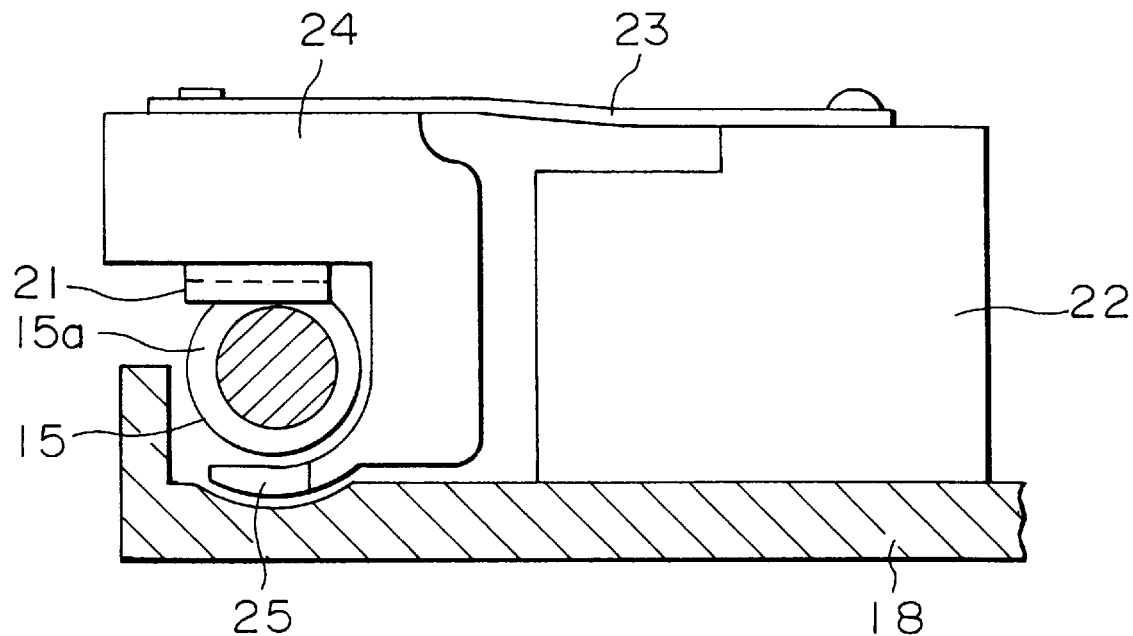
FIG. 5 is a main part sectional view showing another embodiment of the optical pickup transport mechanism according to the present invention.
Figure 6:
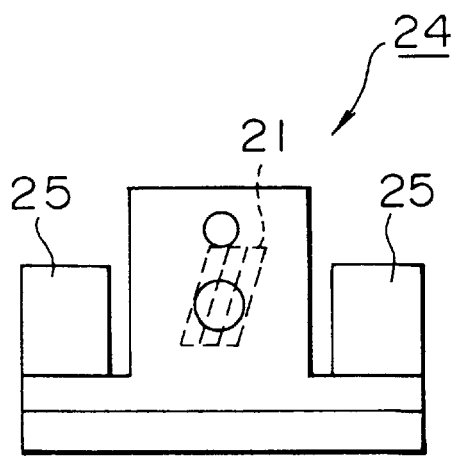
FIG. 6 is a plan view of a loose fit member with an engaging projection shown in FIG. 5.

FIG. 5 is a main part sectional view showing another embodiment of an optical pickup transport mechanism according to the present invention; and FIG. 6 is a plan view of a loose fit member with an engaging projection shown in FIG. 5. In these drawings, the components corresponding to those of FIGS. 1 and 2 are indicated by the same reference numerals.

In the optical pickup transport mechanism shown in FIGS. 5 and 6, a loose fit member 24, which is a molded article, is attached to a spacer 22 provided on the mount 18 for an optical pickup through a leaf spring 23. The loose fit member 24 has the engaging projection 21 downwardly projected from the top face thereof which is pressed into the helical slot 15a in the screw shaft 15, and a pair of laterally projecting regulation pieces 25 which are located on the opposite side of the engaging projection 21 with the screw shaft 15 therebetween and closely facing the screw shaft 15. Thus, when an external shock is applied on the optical pickup, and the engaging projection 21 has a chance to disengage from the helical slot 15a in the screw shaft 15, the regulation pieces 25 abut against the screw shaft 15 so as to prevent disengagement of the engaging projection 21. Therefore, according to this embodiment, as in the case of the foregoing embodiment, the engaging projection 21 cannot jump up to such an extent as to disengage from the helical slot 15a, and there is almost no risk of trouble or damage to the optical pickup, even if an external shock is applied thereto.

Figure 7:
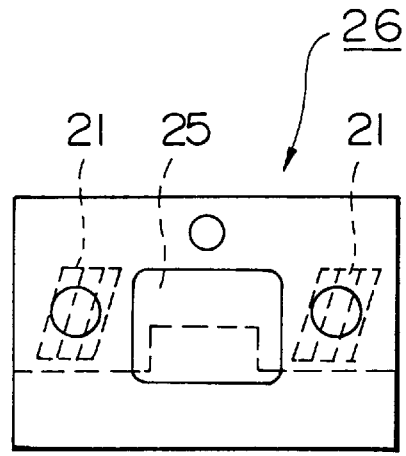
FIG. 7 is a plan view showing a modification of the loose fit member.

Although the loose fit member 24 having one engaging projection 21 and two regulation pieces 25 is employed in this embodiment, as shown in FIG. 6, the same effect can be expected for the loose fit 26 having two engaging projections 21 and one regulation piece 25, as shown in FIG. 7.

Figure 8:
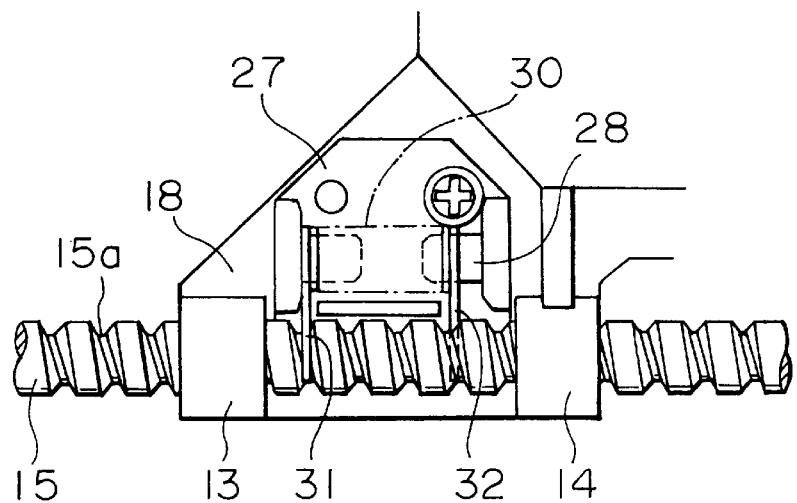
FIG. 8 is a main part plan view showing a further embodiment of the optical pickup transport mechanism according to the present invention.
Figure 9:
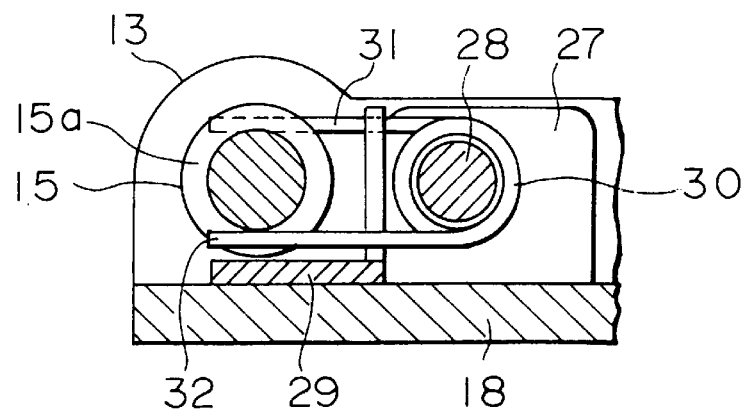
FIG. 9 is a sectional view of the optical pickup transport mechanism shown in FIG. 8.
Figure 10:
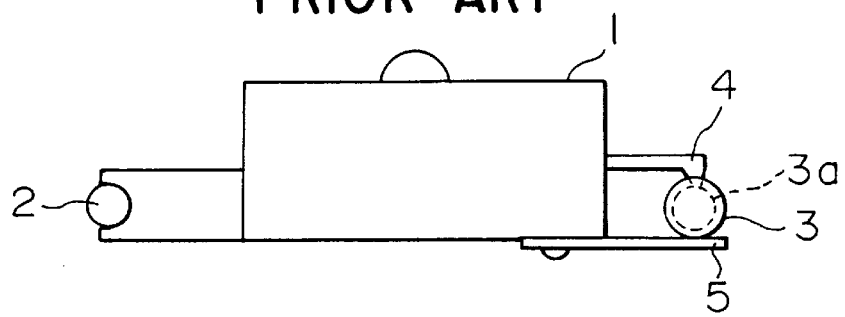
FIG. 10 schematically illustrates a conventional optical pickup transport mechanism.

FIG. 8 is a main part plan view showing a further embodiment of the optical pickup transport mechanism according to the present invention; and FIG. 9 is a sectional view of the optical pickup transport mechanism. In these drawings, the components corresponding to those of FIGS. 1 and 2 are indicated by the same reference numerals.

In the optical pickup transport mechanism shown in FIGS. 8 and 9, a supporting member 27, which is a molded article, is secured on the mount 18 for the optical pickup by screws. The supporting member 27 has spindles 28 formed on both opposite side walls thereof, and a regulation piece 29 formed on the bottom face thereof. A coil spring 30 is held by the spindles 28, and a pair of engaging projections 31 and 32 extending from both ends of the coil spring 30 are elastically brought into contact with the helical slot 15a in the screw shaft 15 with the screw shaft 15 therebetween, and the regulation piece 29 of the supporting member 27 closely face the lower engaging projection 32. Thus, when an external shock is applied to the optical pickup, and the engaging projections 31 and 32 have a chance to disengage from the helical slot 15a in the screw shaft 15, the regulation piece 29 regulates the position of the lower engaging projection 32. Therefore, according to this embodiment, as in the case of the foregoing embodiments, the engaging projections 31 and 32 cannot jump up to such an extent as to disengage from the helical slot 15a, and there is almost no risk of trouble or damage to the optical pickup, even if an external shock is applied thereto.

What is claimed is:

1. An optical pickup transport mechanism in which one side of an optical pickup performing reading and writing of information with respect to an optical disc is slidably supported by a guide shaft said optical pickup transport mechanism comprising:

an engaging projection provided on the other side of the optical pickup slidably engaged with a helical slot in a screw shaft;

a spring plate member fixed to a predetermined section of said optical pickup;

a portion of said spring plate member pressed into said helical slot to form said engaging projection wherein said portion of said spring plate member is displaced at an extremity of said spring plate;

a first regulation section for loosely receiving said screw shaft thereinto;

a second regulation section formed by extending said predetermined section to a position where it closely faces the back face of said engaging projection, said second regulation section being slidably supported on the chassis of the drive for said disc and mounted so as to limit the movement of said engaging projection in a transverse direction; and a stepping motor for rotating said screw shaft, thereby reciprocating said optical pickup through said engaging projection.

2. An optical pickup transport mechanism according to claim 1, wherein said spring plate member is formed with a rising piece which acts as a pickup for lifting said spring plate member and a locking piece which acts as a rotation regulating member.

* * * * *